(12) United States Patent
Saul et al.

(10) Patent No.: US 12,541,988 B2
(45) Date of Patent: Feb. 3, 2026

(54) TECHNIQUES FOR GENERATION OF SYNTHETIC DATA WITH SIMULATED HANDWRITING

(71) Applicant: Capital One Services, LLC, McLean, VA (US)

(72) Inventors: David Saul, Richmond, VA (US); Neeraj Sharma, Glen Allen, VA (US); Andrew Joyner, Henrico, VA (US); Kenneth B. Brewer, Vienna, VA (US); Ratnakar Krishnama, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/643,332

(22) Filed: Apr. 23, 2024

(65) Prior Publication Data

US 2024/0273933 A1 Aug. 15, 2024

Related U.S. Application Data

(63) Continuation of application No. 17/685,023, filed on Mar. 2, 2022, now Pat. No. 11,995,906.

(51) Int. Cl.
*G06V 30/32* (2022.01)
*G06T 3/60* (2006.01)
(Continued)

(52) U.S. Cl.
CPC .......... *G06V 30/19147* (2022.01); *G06T 3/60* (2013.01); *G06T 11/40* (2013.01); *G06V 30/32* (2022.01)

(58) Field of Classification Search
CPC ...... G06V 30/00–43; G06T 3/60; G06T 11/40
See application file for complete search history.

(56) References Cited

U.S. PATENT DOCUMENTS

| 11,995,906 B2 * | 5/2024 | Saul ........................ G06T 11/40 |
| 2004/0205677 A1 * | 10/2004 | Hughes ................. G06F 40/109 |
| | | 715/263 |

(Continued)

OTHER PUBLICATIONS

Rico Blanes Synthetic Handwritten Text Generation TFG EN Enginyeria Informatica, Escola Dâenginyeria (EE), Universitat Autonoma De Barcelona (UAB) 2018 (Year: 2018).*

*Primary Examiner* — Sean T Motsinger
(74) *Attorney, Agent, or Firm* — KDW Firm PLLC

(57) ABSTRACT

Various embodiments are generally directed to techniques for generating synthetic data with simulated handwriting, such as for training or evaluating a computer vision process, for instance. Some embodiments are particularly directed to creating simulated handwriting based on input text. For example, attributes of various glyphs included in typefaces stored in a vectorized graphics format may be randomized to produce randomized glyphs. The randomized glyphs may then be used to replace glyphs in an input text to generate simulated handwriting for the input text. In some embodiments, simulated handwriting may be overlaid with a background image to produce a synthetic handwriting image. In some such embodiments, noise may be introduced into the synthetic handwriting image to generate synthetic data comprising the simulated handwriting. In one embodiment, the synthetic data may simulate a handwritten check that is used to train or evaluate an optical character recognition process.

20 Claims, 8 Drawing Sheets

(51) Int. Cl.
  *G06T 11/40*  (2006.01)
  *G06V 30/19*  (2022.01)

(56) References Cited

U.S. PATENT DOCUMENTS

| | | | |
|---|---|---|---|
| 2014/0267302 A1* | 9/2014 | Lubetkin | G06T 11/203 |
| | | | 345/467 |
| 2016/0078660 A1* | 3/2016 | Bacus | G06F 40/109 |
| | | | 345/467 |
| 2016/0328366 A1* | 11/2016 | Elarian | G06V 30/153 |
| 2016/0328620 A1* | 11/2016 | Elarian | G06F 18/2321 |
| 2019/0272447 A1* | 9/2019 | Wong | G06F 18/24133 |
| 2019/0303422 A1* | 10/2019 | Carmona Duarte | G06F 40/10 |
| 2020/0160978 A1* | 5/2020 | Prosky | A61B 6/563 |
| 2021/0150789 A1* | 5/2021 | Szarzynski | G06T 11/203 |
| 2021/0166013 A1* | 6/2021 | Tensmeyer | G06N 3/045 |
| 2021/0326631 A1* | 10/2021 | Chaudhary | G06V 30/413 |
| 2022/0148326 A1* | 5/2022 | Tensmeyer | G06V 10/82 |
| 2022/0180043 A1* | 6/2022 | Tang | G06V 30/1916 |
| 2022/0189083 A1* | 6/2022 | Tang | G06V 30/19127 |
| 2022/0237935 A1* | 7/2022 | Liu | G06V 30/287 |
| 2023/0114293 A1* | 4/2023 | Liu | G06N 3/047 |
| | | | 345/467 |
| 2023/0282015 A1* | 9/2023 | Saul | G06V 30/10 |
| | | | 382/181 |
| 2023/0316792 A1* | 10/2023 | Hu | G06V 30/19147 |
| 2023/0394720 A1* | 12/2023 | Maksai | G06V 30/226 |

* cited by examiner

TECHNIQUES FOR GENERATION OF SYNTHETIC DATA WITH SIMULATED HANDWRITING

CROSS-REFERENCE TO RELATED APPLICATIONS

This application claims priority to U.S. patent application Ser. No. 17/685,023 filed on Mar. 2, 2022, entitled "TECHNIQUES FOR GENERATION OF SYNTHETIC DATA WITH SIMULATED HANDWRITING", the disclosure of which is incorporated herein by reference in its entirety.

FIELD

The present disclosure relates generally to the field of data simulation. In particular, the present disclosure relates to devices, systems, and methods for synthetic data comprising simulated handwriting.

BACKGROUND

Synthetic data may refer to data applicable to a given situation that are not obtained by direct measurement. Typically, synthetic data is generated to meet specific needs or certain conditions that may not be readily available in real data (e.g., production data). This can be useful when designing computer system because the synthetic data can be used as a simulation or as a theoretical value, situation, etcetera. Thus, synthetic data may be used to train systems to handle a situation prior to occurrence of the situation. For example, synthetic data may be used to evaluate or train computer vision processes when sufficient real data is not available. Oftentimes computer vision processes seek to automate tasks that the human visual system can do. Computer vision processes may include one or more of image processing, image analysis, and machine vision.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one embodiment, the present disclosure relates to an apparatus comprising a processor and memory comprising instructions that when executed by the processor cause the processor to perform one or more of: identify a set of typefaces, each typeface in the set of typefaces comprising a collection of glyphs, and each glyph in the collection of glyphs stored in a vector graphics format with a set of vector attributes; identify a set of randomization parameters, the set of randomization parameters comprising a plurality of randomization factors; select a randomized typeface from the set of typefaces based on a first randomization factor of the plurality of randomization factors; identify an input text comprising a first character; determine an exchange glyph, from the collection of glyphs included in the randomized typeface, that corresponds to the first character of the input text; generate a randomized set of vector attribute values for the exchange glyph based on the set of vector attributes corresponding to the exchange glyph and a second randomization factor of the plurality of randomization factors; randomize the exchange glyph with the randomized set of vector attribute values to produce a randomized glyph; generate simulated handwriting comprising the randomized glyph; and utilize the simulated handwriting to train or evaluate a computer vision process.

In various embodiments, the instructions, when executed by the processor, further cause the processor to perform one or more of: overlay the simulated handwriting with a background image to produce a synthetic handwriting image; generate synthetic data based on the synthetic handwriting image; and utilize the synthetic data comprising the simulated handwriting to train or evaluate the computer vision process. In some embodiments, the synthetic data utilizes a raster graphics format. In many embodiments, the instructions, when executed by the processor, further cause the processor to select the background image from a set of background images based on at least one randomization factor of the one or more randomization factors. In several embodiments, the instructions, when executed by the processor, further cause the processor to introduce noise into the synthetic handwriting image to generate the synthetic data. In several such embodiments, the instructions, when executed by the processor, further cause the processor to add one or more of image blur, errata, wrinkles, misalignment, and rotation to the synthetic handwriting image to introduce noise into the synthetic handwriting image to generate the synthetic data. In various embodiments, the randomized set of vector attribute values for the exchange glyph includes values for one or more of a coordinate, a path, a curve, a font size, a weight, an alignment, a color, a consistency, a kerning, a baseline, a leading, a counter, and a Bezier curve. In some embodiments, the instructions, when executed by the processor, further cause the processor to vary a default value for at least one vector attribute of the exchange glyph based on the second randomization factor to generate the randomized set of vector attribute values for the exchange glyph. In many embodiments, the second randomization factor comprises one or more ranges corresponding to values for vector attributes.

In one embodiment, the present disclosure relates to at least one non-transitory computer-readable medium comprising a set of instructions that, in response to being executed by a processor circuit, cause the processor circuit to perform one or more of: identify a set of typefaces, each typeface in the set of typefaces comprising a collection of glyphs, and each glyph in the collection of glyphs stored in a vector graphics format with a set of vector attributes; identify a set of randomization parameters, the set of randomization parameters comprising a plurality of randomization factors; select a randomized typeface from the set of typefaces based on a first randomization factor of the plurality of randomization factors; identify an input text comprising a first character; determine an exchange glyph, from the collection of glyphs included in the randomized typeface, that corresponds to the first character of the input text; generate a randomized set of vector attribute values for the exchange glyph based on the set of vector attributes corresponding to the exchange glyph and a second randomization factor of the plurality of randomization factors; randomize the exchange glyph with the randomized set of vector attribute values to produce a randomized glyph; generate simulated handwriting comprising the randomized glyph; and utilize the simulated handwriting to train or evaluate an optical character recognition (OCR) process.

In various embodiments, the instructions, when executed by the processor, further cause the processor to perform one or more of: overlay the simulated handwriting with a background image to produce a synthetic handwriting image;

generate synthetic data based on the synthetic handwriting image; and utilize the synthetic data comprising the simulated handwriting to train or evaluate the OCR process. In various such embodiments, the set of instructions, in response to execution by the processor circuit, further cause the processor circuit to introduce noise into the synthetic handwriting image to generate the synthetic data. In some such embodiments, the set of instructions, in response to execution by the processor circuit, further cause the processor circuit to add one or more of image blur, errata, wrinkles, misalignment, and rotation to the synthetic handwriting image to introduce noise into the synthetic handwriting image to generate the synthetic data. In many embodiments, the randomized set of vector attribute values for the exchange glyph includes values for one or more of a coordinate, a path, a curve, a font size, a weight, an alignment, a color, a consistency, a kerning, a baseline, a leading, a counter, and a Bezier curve. In several embodiments, the set of instructions, in response to execution by the processor circuit, further cause the processor circuit to vary a default value for at least one vector attribute of the exchange glyph based on the second randomization factor to generate the randomized set of vector attribute values for the exchange glyph. In various embodiments, the second randomization factor comprises one or more ranges corresponding to values for vector attributes.

In one embodiment, the present disclosure relates to a computer-implemented method, comprising: identifying a set of typefaces, each typeface in the set of typefaces comprising a collection of glyphs, and each glyph in the collection of glyphs stored in a vector graphics format with a set of vector attributes; identifying a set of randomization parameters, the set of randomization parameters comprising a plurality of randomization factors; selecting a randomized typeface from the set of typefaces based on a first randomization factor of the plurality of randomization factors; identifying an input text comprising a first character; determining an exchange glyph, from the collection of glyphs included in the randomized typeface, that corresponds to the first character of the input text; generating a randomized set of vector attribute values for the exchange glyph based on the set of vector attributes corresponding to the exchange glyph and a second randomization factor of the plurality of randomization factors; randomizing the exchange glyph with the randomized set of vector attribute values to produce a randomized glyph; generating simulated handwriting comprising the randomized glyph; and utilizing the simulated handwriting to train or evaluate an optical character recognition (OCR) process.

In various embodiments, the computer-implemented method includes overlaying the simulated handwriting with a background image to produce a synthetic handwriting image; generating synthetic data based on the synthetic handwriting image; and utilizing the synthetic data comprising the simulated handwriting to train or evaluate the OCR process. In many embodiments, the computer-implemented method includes selecting the background image from a set of background images based on at least one randomization factor of the one or more randomization factors. In some embodiments, the computer-implemented method includes varying a default value for at least one vector attribute of the exchange glyph based on the second randomization factor to generate the randomized set of vector attribute values for the exchange glyph.

DETAILED DESCRIPTION

Figure 1:
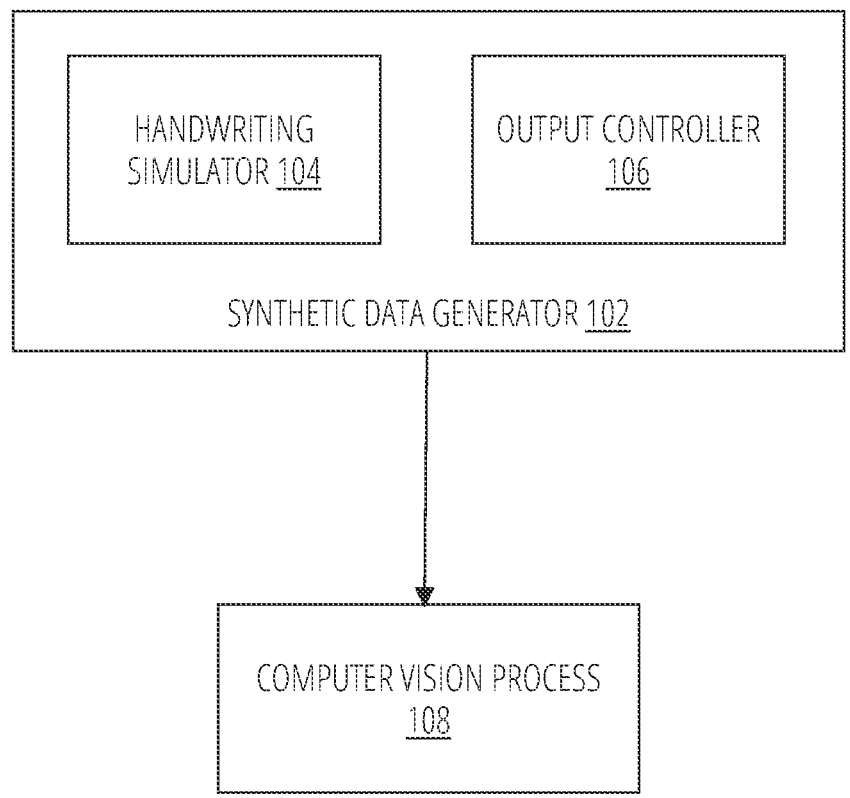
FIG. 1 illustrates an exemplary synthetic data generator in conjunction with a computer vision process according to one or more embodiments described hereby.

Various embodiments are generally directed to techniques for generating synthetic data with simulated handwriting, such as for training or evaluating a computer vision process, for instance. Some embodiments are particularly directed to creating simulated handwriting based on input text. For example, attributes of various glyphs included in typefaces stored in a vectorized graphics format may be randomized to produce randomized glyphs. The randomized glyphs may then be used to replace glyphs in an input text to generate simulated handwriting for the input text. In some embodiments, simulated handwriting may be overlaid with a background image to produce a synthetic handwriting image. In some such embodiments, noise may be introduced into the synthetic handwriting image to generate synthetic data comprising the simulated handwriting. In one embodiment, the synthetic data may simulate a handwritten check that is used to train or evaluate an optical character recognition process. These and other embodiments are described and claimed.

Some challenges facing the generation of synthetic data include creating sufficient synthetic data to train robust computer vision processes, such as for check image processing, that can accommodate the wide range of variation in human handwriting and images captured by humans, such as images of the human handwriting. Existing typefaces are too uniform and/or consistent to account for this wide range of variation in human handwriting. Adding further complexity, real data (e.g., production data) comprising sufficient instances of actual handwriting to train a robust computer vision process may not be readily available. Oftentimes the use of actual handwriting examples is restricted due to the confidential nature of the content. For instance, in check image processing handwriting examples may include confidential information such as nonpublic information (NPI) or payment card information (PCI), and therefore cannot be used. These and other factors may result in synthetic data that does not adequately represent actual handwriting or images captured by humans, such as images of handwriting.

Such limitations can drastically reduce the usability of the synthetic data, contributing to inaccurate systems and lost opportunities for automation.

Various embodiments described hereby include a synthetic data generator that is able to simulate handwriting and/or images captured by humans in a realistic and usable manner. In some embodiments, the simulated handwriting may be used to train robust computer vision processes, such as OCR processes for check image processing. Oftentimes the computer vision process may utilize a machine learning (ML) algorithm. In many embodiments, vector attributes of glyphs in various typefaces may be randomized and used to replace an input text, such as from a data generation service. In various embodiments, the simulated handwriting may be overlaid with a background image to produce a synthetic handwriting image. In various such embodiments, noise may be introduced into the synthetic handwriting image to produce synthetic data with simulated handwriting in an efficient and realistic manner. Further, the synthetic data generated may accurately represent the variations in human handwriting and/or images captured by humans that corresponds with production data that will be provided as input to a computer vision process. Thus, techniques described hereby may enable the generation of simulated handwriting, synthetic handwriting images, and/or synthetic data that can be used to train a robust computer vision process, such as for automating tasks and reducing the need for manual review.

In these and other ways, components and techniques described hereby may identify methods to increase efficiency, decrease performance costs, decrease computational cost, and/or reduce resource requirements to create synthetic data and/or computer vision processes in an accurate, applicable, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For instance, the practical application may include the generation of synthetic data that accurately represents human handwriting or images captured by a human. In another instance, the practical application may include the generation of a computer vision process that accurately and reliably interprets human handwriting. Further, one or more of the aspects, techniques, and/or components described hereby may be utilized to improve the technical fields of one or more of synthetic data generation, computer vision, image processing, image analysis, machine learning, and/or machine vision.

In several embodiments, components described hereby may provide specific and particular manners of to enable the generation of synthetic data that accurately represents human handwriting and images captured by humans. In several such embodiments, for example, the specific and particular manners include randomizing vector attributes of glyphs included in typefaces to simulate variations in human handwriting or overlaying simulated handwriting onto a background image and introducing noise to simulate images captured by a human. In many embodiments, one or more of the components described hereby may be implemented as a set of rules that improve computer-related technology by allowing a function not previously performable by a computer that enables an improved technological result to be achieved. For example, the function allowed may include one or more of: identifying a set of typefaces, each typeface in the set of typefaces comprising a collection of glyphs, and each glyph in the collection of glyphs stored in a vector graphics format with a set of vector attributes; identifying a set of randomization parameters, the set of randomization parameters comprising a plurality of randomization factors; selecting a randomized typeface from the set of typefaces based on a first randomization factor of the plurality of randomization factors; identifying an input text comprising a first character; determining an exchange glyph, from the collection of glyphs included in the randomized typeface, that corresponds to the first character of the input text; generating a randomized set of vector attribute values for the exchange glyph based on the set of vector attributes corresponding to the exchange glyph and a second randomization factor of the plurality of randomization factors; randomizing the exchange glyph with the randomized set of vector attribute values to produce a randomized glyph; generating simulated handwriting comprising the randomized glyph; utilizing the simulated handwriting to train or evaluate an computer vision process; overlaying the simulated handwriting with a background image to produce a synthetic handwriting image; generating synthetic data based on the synthetic handwriting image; and utilizing the synthetic data comprising the simulated handwriting to train or evaluate the computer vision process.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in many cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates a synthetic data generator 102 in conjunction with a computer vision process 108 according to one or more embodiments disclosed hereby. In various embodiments, the synthetic data generator 102 may create data including simulated handwriting for training or evaluating the computer vision process 108. For example, synthetic data generator 102 may create a set of simulated bank checks to train or evaluate a computer vision process for mobile check deposit technology. The synthetic data generator 102 may include a handwriting simulator 104 and an output controller 106. In some embodiments, FIG. 1 may include one or more components that are the same or similar to one or more other components of the present disclosure. Further, one or more components of FIG. 1, or aspects thereof, may be incorporated into other embodiments of the present disclosure, or excluded from the disclosed embodiments, without departing from the scope of this disclosure. For example, some embodiments may exclude the computer vision process 108 without departing from the scope of this disclosure. Additionally, one or more components of other embodiments of the present disclosure, or aspects thereof, may be incorporated into one or more components of FIG. 1, without departing from the scope of this disclosure. Embodiments are not limited in this context.

Figure 2:
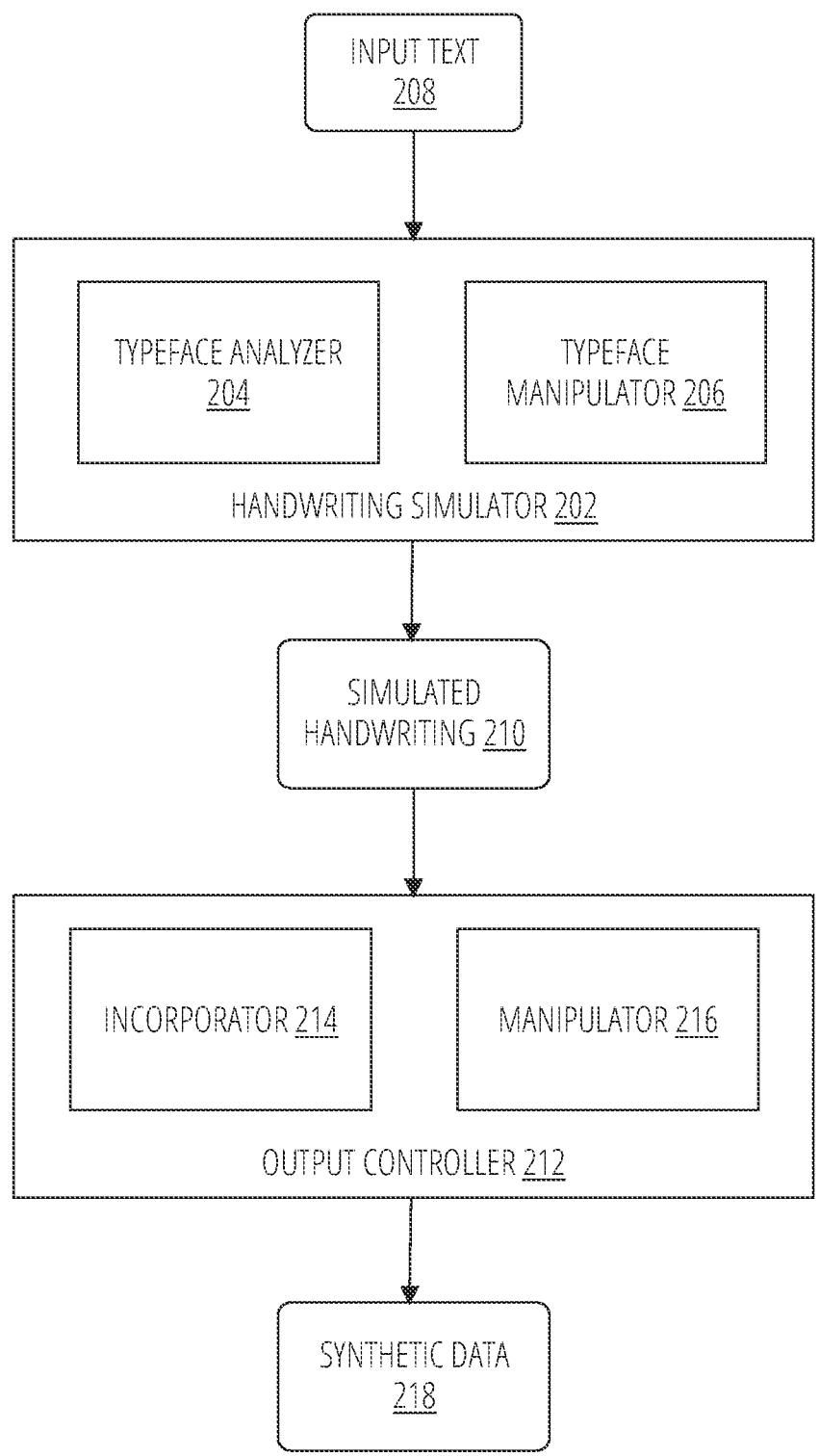
FIG. 2 illustrates various aspects of a handwriting simulator and an output controller of a synthetic data generator according to one or more embodiments described hereby.

FIG. 2 illustrates various aspects of a handwriting simulator 202 and an output controller 212 of a synthetic data generator according to one or more embodiments disclosed hereby. In various embodiments, the handwriting simulator 202 may generate simulated handwriting 210 based on input text 208 and the output controller 212 may generate synthetic data 218 comprising the simulated handwriting 210. The handwriting simulator 202 may include a typeface analyzer 204 and a typeface manipulator 206. The output controller 212 may include an incorporator 214 and a manipulator 216. In some embodiments, FIG. 2 may include one or more components that are the same or similar to one or more other components of the present disclosure. For example, handwriting simulator 202 may be the same or similar to handwriting simulator 104 and output controller 212 may be the same or similar to output controller 106. Further, one or more components of FIG. 2, or aspects thereof, may be incorporated into other embodiments of the present disclosure, or excluded from the disclosed embodiments, without departing from the scope of this disclosure. For example, output controller 212 may be excluded from some embodiments without departing from the scope of this disclosure. Additionally, one or more components of other embodiments of the present disclosure, or aspects thereof, may be incorporated into one or more components of FIG. 2, without departing from the scope of this disclosure. For example, computer vision process 108 may be incorporated into the illustrated embodiment such that synthetic data 218 is provided as input to the computer vision process 108 without departing from the scope of this disclosure. Embodiments are not limited in this context.

Generally, the handwriting simulator 202 may produce simulated handwriting 210 based on input text 208. In various embodiments, the input text 208 may include synthetic data. However, the input text 208 may not include simulated handwriting. For example, input text 208 may include one or more of names, addresses, account numbers, routing numbers, signatures, endorsements, and the like for simulated account holders. Additionally, input text 208 may include one or more of amounts, dates, recipients, and the like for simulated transactions corresponding to the simulated account holders. Accordingly, the handwriting simulator 202 may generate simulated handwriting 210 comprising the names, addresses, and/or account numbers for the simulated account holders and the dates and/or amounts for the simulated transactions.

The output controller 212 may then combine the simulated handwriting 210 with one or more other data elements to produce synthetic data 218 comprising the simulated handwriting 210. For instance, the output controller 212 may overlay one or more of the name, address, account number, routing number, signature, endorsement for a simulated account holder and one or more of the date, amount, and recipient for a simulated transaction onto an image of a check to produce a simulated check to form at least a portion of synthetic data 218. In some embodiments, this procedure may be repeated for a set of simulated account holders to produce synthetic data comprising a set of simulated checks. In various embodiments, some of the input text 208 may be incorporated into the synthetic data 218 without being converted to simulated handwriting 210. For example, account numbers and routing numbers may be overlaid onto an image of a check without being converted to simulated handwriting. Input text 208 that is not converted to simulated handwriting 210 may still be changed from a first typeface to a second typeface. In some embodiments, the input text 208 may be utilized as labels for the resulting simulated handwriting 210. Accordingly, when using the simulated handwriting 210 to train or evaluate a computer vision process, such as one utilizing a ML algorithm, the input text 208 can be used to evaluate the accuracy of the computer vision process.

Figure 3:
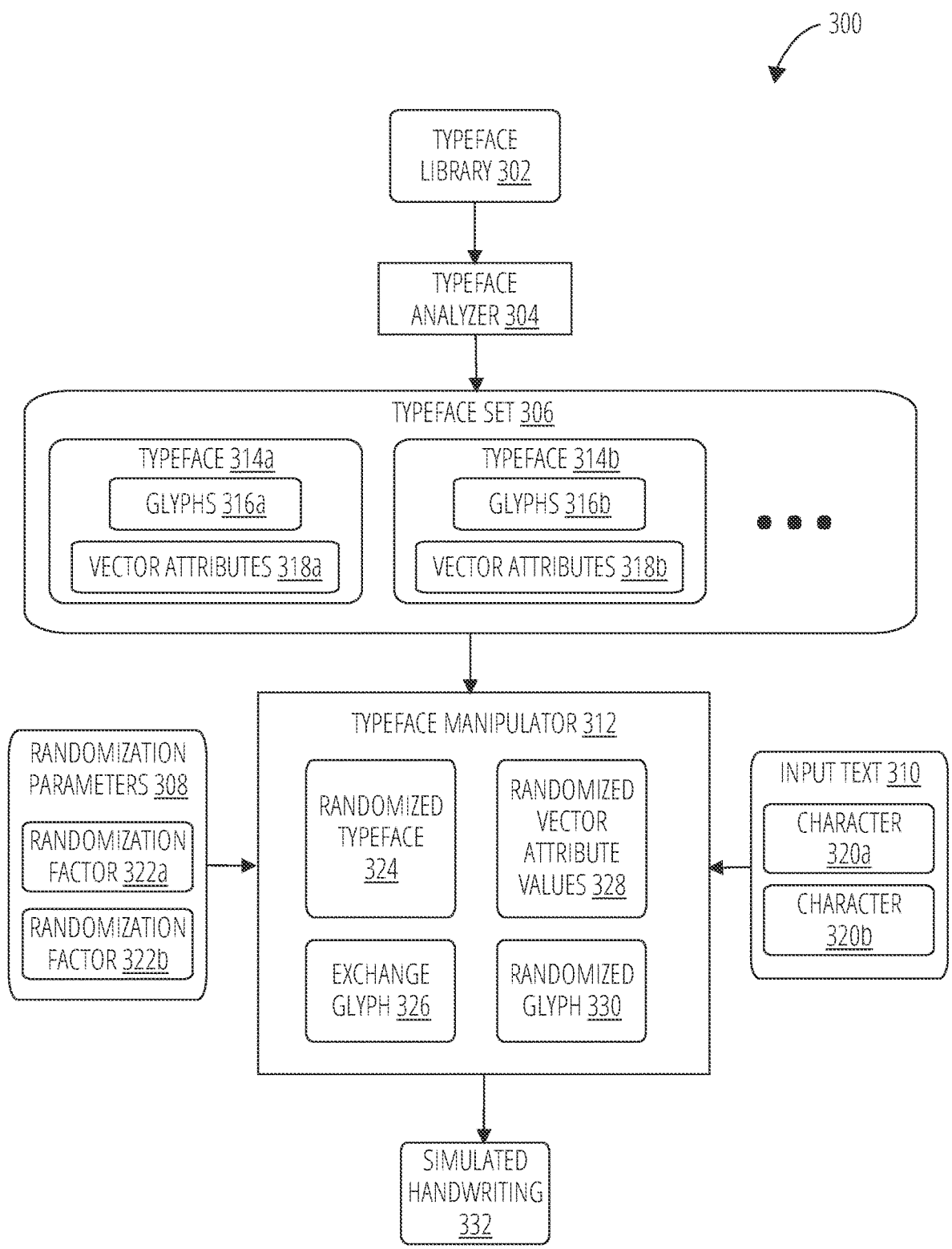
FIG. 3 illustrates an exemplary handwriting simulator process flow according to one or more embodiments described hereby.

FIG. 3 illustrates an exemplary handwriting simulator process flow 300 according to one or more embodiments disclosed hereby. As will be described in more detail below, in handwriting simulator process flow 300, typeface analyzer 304 may evaluate a typeface set 306 to identify a typeface library 302. Then, typeface manipulator 312 may utilize the typeface library 302, one or more randomization parameters 308, and input text 310 to generate simulated handwriting 332. In some embodiments, FIG. 3 may include one or more components that are the same or similar to one or more other components of the present disclosure. For example, typeface analyzer 304 may be the same or similar to typeface analyzer 204 and typeface manipulator 312 may be the same or similar to input text 208. Further, one or more components of FIG. 3, or aspects thereof, may be incorporated into other embodiments of the present disclosure, or excluded from the disclosed embodiments, without departing from the scope of this disclosure. For example, typeface analyzer 304 may be excluded from some embodiments without departing from the scope of this disclosure. Additionally, one or more components of other embodiments of the present disclosure, or aspects thereof, may be incorporated into one or more components of FIG. 3, without departing from the scope of this disclosure. Embodiments are not limited in this context.

The typeface library 302 may include a plurality of typefaces. In various embodiments, the typeface analyzer 304 may be utilized to identify typefaces in typeface library 302 that resemble handwriting (e.g., typeface 314a, typeface 314b). In various embodiments, semblance to handwriting may be determined based on various characteristics of the typefaces, such as slant, curvature, and spacing. For example, typefaces with discrete changes (e.g., 90 degree angles), as opposed to continuous changes (e.g., curves), may not be identified as resembling handwriting. Each typeface in typeface set 306 may be stored in a vector graphics format. In some embodiments, typeface analyzer 304 may filter out any typefaces in typeface library 302 that are not stored in a vector graphics format with a set of vector attributes. In the illustrated embodiment, typeface analyzer 304 identifies typeface set 306 including a first typeface 314a with glyphs 316a and vector attributes 318a and a second typeface 314b with glyphs 316b and vector attributes 318b from typeface library 302. In various embodiments, the vector attributes may include one or more of a coordinate, a path, a curve, a font size, a weight, an alignment, a color, a consistency, a kerning, a baseline, a leading, a counter, and a Bezier curve. In many embodiments, the vector attributes may include default values.

Typeface manipulator 312 may utilize the typeface set 306, one or more randomization parameters 308, and input text 310 to generate simulated handwriting 332. For example, typeface manipulator 312 may select randomized typeface 324 from typeface set 306 based on one or more randomization parameters 308. In some embodiments, one or more of the randomization parameters 308 may comprise seeds for random number generators. In various embodiments, one or more of the randomization parameters 308 may include ranges corresponding to values for vector attributes. In the illustrated embodiment, input text 310 may include character 320a and character 320b, however, it will be appreciated that input text 310 may include any number of characters without departing from the scope of this disclosure. Similarly, randomization parameters 308 may include any number of randomization factors without departing from the scope of this disclosure.

In various embodiments, typeface manipulator 312 may replace each character in the input text 310 with a randomized glyph to generate simulated handwriting. According to at least one embodiment, an exemplary process for replacing character 320a in input text 310 may proceed as follows. However, it will be appreciated that this process may be repeated for each character or each word or each portion of input text (e.g., each account number, each address, each name, etcetera) to produce simulated handwriting. Typeface manipulator 312 may select typeface 314b as randomized typeface 324 based on randomization factor 322a. In some embodiments, the randomized typeface 324 may be selected based on one or more randomization factors and the character currently being replaced (i.e., character 320a). In various embodiments, an exchange glyph 326 for character 320a may be identified based on the glyph in glyphs 316a that corresponds to character 320a. For example, if character 320a comprises an "a" then typeface manipulator 312 may determine the glyph in glyphs 316a that corresponds to an "a" as the exchange glyph 326. The typeface manipulator 312 may then generate randomized vector attribute values 328 for the exchange glyph 326 based on one or more of the randomization parameters 308 (e.g., randomization factor 322b). The randomized vector attribute values 328 may then be applied to exchange glyph 326 to produce the randomized glyph 330. Finally, the randomized glyph 330 may be used to replace character 320a in simulated handwriting 332. In various embodiments, simulated handwriting 332 may comprise randomized glyphs for each character of text utilized in a single document. For example, simulated handwriting 332 may include a name, amount, date, signature, and endorsement for a simulated check.

Figure 4:
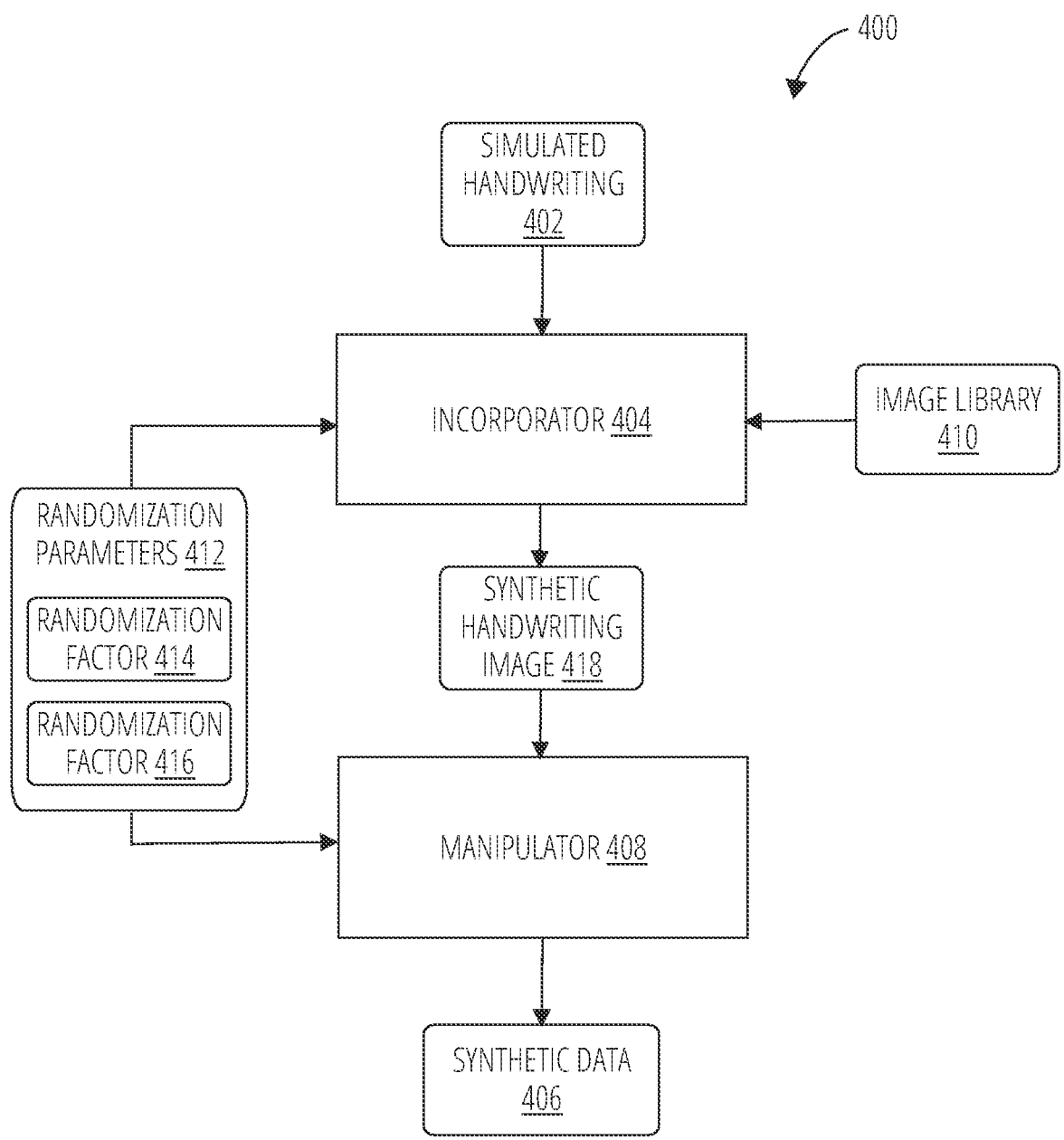
FIG. 4 illustrates an exemplary output controller process flow according to one or more embodiments described hereby.

FIG. 4 illustrates an exemplary output controller process flow 400 according to one or more embodiments disclosed hereby. As will be described in more detail below, in output controller process flow 400, incorporator 404 may utilize simulated handwriting 402, one or more randomization parameters 412, and image library 410 to produce synthetic handwriting image 418. Then manipulator 408 may utilize the synthetic handwriting image 418 and one or more randomization parameters 412 to generate synthetic data 406. In some embodiments, FIG. 4 may include one or more components that are the same or similar to one or more other components of the present disclosure. For example, incorporator 404 may be the same or similar to incorporator 214 and manipulator 408 may be the same or similar to manipulator 216. Further, one or more components of FIG. 4, or aspects thereof, may be incorporated into other embodiments of the present disclosure, or excluded from the disclosed embodiments, without departing from the scope of this disclosure. For example, manipulator 408 may be excluded from some embodiments without departing from the scope of this disclosure. Additionally, one or more components of other embodiments of the present disclosure, or aspects thereof, may be incorporated into one or more components of FIG. 4, without departing from the scope of this disclosure. Embodiments are not limited in this context.

In the illustrated embodiment, incorporator 404 may overlay simulated handwriting 402 with one or more images from image library 410 produce synthetic handwriting image 418. The image library 410 may include images of various documents and document features upon which handwriting may be applied or found. For example, image library 410 may include one or more of forms, questionnaires, checks, watermarks, contracts, surveys, and backgrounds. In some embodiments, incorporator 404 may combine multiple images from image library 410 to overlay simulated handwriting 402 onto. For example, an image of an image of a blank check may be combined with an image of a tiger and an image of a watermark to create a check image. Simulated handwriting 402 may then be overlaid onto the check image to produce synthetic handwriting image 418. In many embodiments, incorporator 404 may identify appropriate sections of the image to add corresponding portions of the simulated handwriting 402. For example, a name may be added to the name section of a check image, an amount may be added to the amount section of the check image, and so on. In many embodiments, the images may be selected from the image library 410 based on one or more of the randomization parameters 412, such as randomization factor 414.

The manipulator 408 may then introduce noise into the synthetic handwriting image 418 to generate synthetic data 406. In some embodiments, manipulator 408 may introduce noise into the synthetic handwriting image 418 based on one or more of randomization parameters 412 (e.g., randomization factor 416). In various embodiments, manipulator 408 may add one or more of image blur, errata, wrinkles, misalignment, and rotation to the synthetic handwriting image 418 to introduce noise into the synthetic handwriting image 418 to generate the synthetic data 406. In some embodiments, the manipulator 408 may convert the synthetic handwriting image 418 to a different format to produce synthetic data 406. For example, the synthetic handwriting image 418 may be converted from a vector graphics format (e.g., .svg) to a raster graphics format (e.g., .jpg or .png).

Figure 5A:
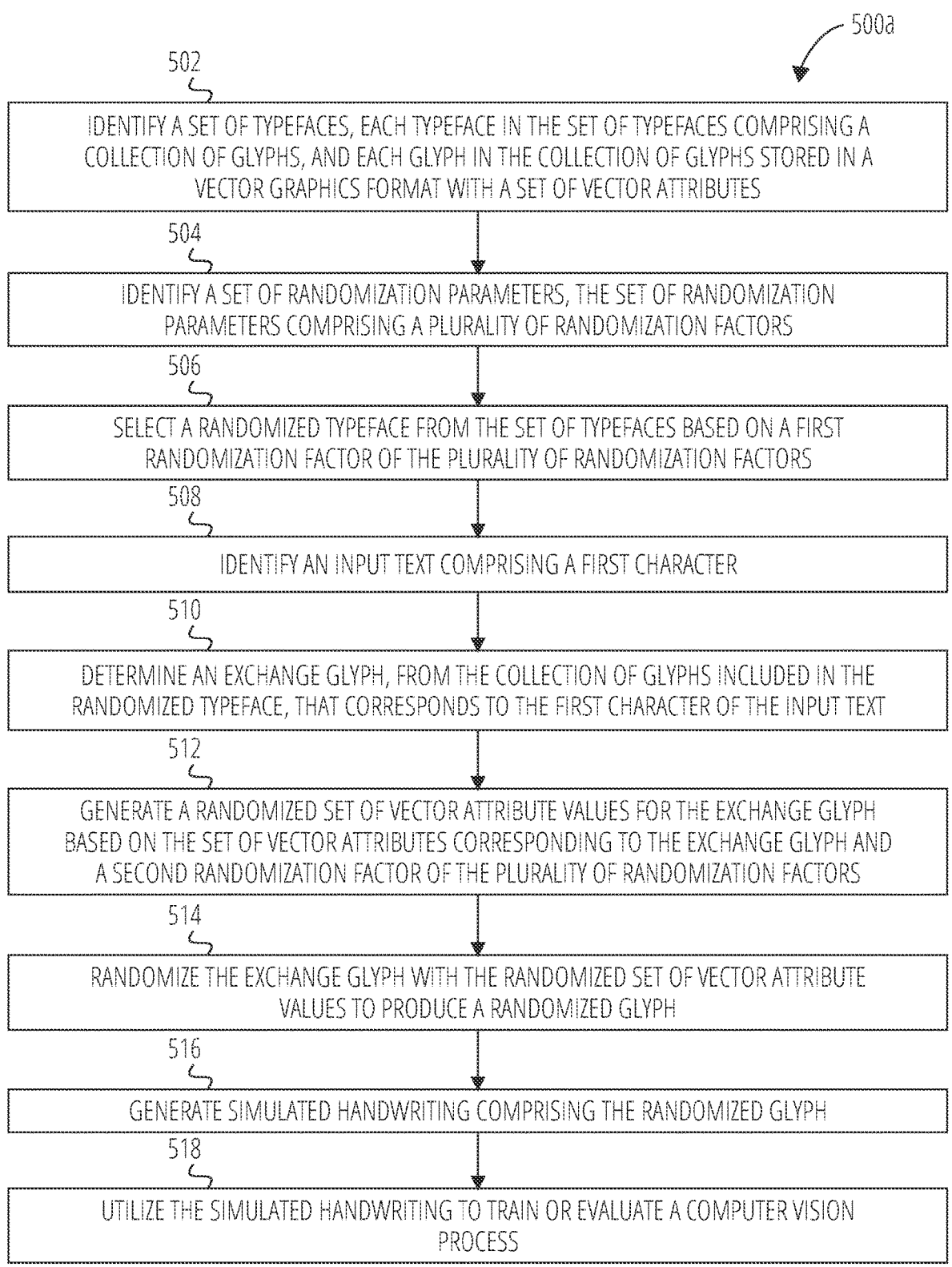
FIG. 5A illustrates an exemplary logic flow according to one or more embodiments described hereby.

FIG. 5A illustrates one embodiment of a logic flow 500a, which may be representative of operations that may be executed in various embodiments in conjunction with techniques disclosed hereby. The logic flow 500a may be representative of some or all of the operations that may be executed by one or more components/devices/environments described hereby, such as synthetic data generator 102, computer vision process 108, handwriting simulator 202, typeface analyzer 304, and/or typeface manipulator 312. The embodiments are not limited in this context.

In the illustrated embodiment, logic flow 500a may begin at block 502. At block 502 "identify a set of typefaces, each typeface in the set of typefaces comprising a collection of glyphs, and each glyph in the collection of glyphs stored in a vector graphics format with a set of vector attributes" a set of typefaces comprising a collection of glyphs stored in a vector graphics format with a set of vector attributes may be identified. For example, typeface manipulator 312 may identify typeface set 306 comprising typeface 314a including glyphs 316a and vector attributes 318a and typeface 314b including glyphs 316b and vector attributes 318b. In several embodiments, each typeface in the typeface set 306 may resemble or be associated with handwriting. In many embodiments, typeface analyzer 304 may generate the typeface set 306 based on typeface library 302.

Continuing to block 504 "identify a set of randomization parameters, the set of randomization parameters comprising a plurality of randomization factors" a set of randomization parameters including a plurality of randomization factors may be identified. For example, typeface manipulator 312 may identify randomization parameters 308 comprising randomization factor 322a and randomization factor 322b. In some embodiments, randomization parameters 308 may be received via a user interface or generated based on input received via a user interface.

Proceeding to block 506 "select a randomized typeface from the set of typefaces based on a first randomization factor of the plurality of randomization factors" a randomized type face may be selected from the set of typefaces based on a first randomization factor. For instance, typeface manipulator 312 may select typeface 314a from typeface set 306 as randomized typeface 324 based on randomization factor 322a. At block 508 "identify an input text comprising a first character" an input text comprising a first character may be identified. For example, typeface manipulator 312 may identify input text 310 comprising character 320a. In some embodiments, the input text 310 may be received from or created by a data generation service. For example, the data generation service may provide a name, address, and account number corresponding to a simulated account holder as input text 310. In various embodiments, the data generation service may comprise a component of the synthetic data generator 102.

At block 510 "determine an exchange glyph, from the collection of glyphs included in the randomized typeface, that corresponds to the first character of the input text" an exchange glyph that corresponds to the first character of the input text may be determined from the collection of glyphs included in the randomized typeface. For example, if character 320a comprises an "a" then typeface manipulator 312 may determine the glyph in glyphs 316a that corresponds to an "a" as the exchange glyph 326.

Proceeding to block 512 "generate a randomized set of vector attribute values for the exchange glyph based on the set of vector attributes corresponding to the exchange glyph and a second randomization factor of the plurality of randomization factors" a randomized set of vector attribute values may be generated for the exchange glyph may be generated based on the set of vector attributes corresponding to the exchange glyph and a second randomization factor. For instance, typeface manipulator 312 may generate randomized vector attribute values 328 for exchange glyph 326 based on the randomization factor 322b and one or more vector attributes in vector attributes 318a that correspond to the exchange glyph 326. In various embodiments, the typeface manipulator 312 may vary a default value for at least one vector attribute of exchange glyph 326 based on the randomization factor 322b, or other randomization parameters, to generate one or more of the randomized vector attribute values 328. In some embodiments, the randomization factor 322b comprises one or more ranges corresponding to values for vector attributes. In various embodiments, the randomized vector attribute values 328 may include values for one or more of a coordinate, a path, a curve, a font size, a weight, an alignment, a color, a consistency, a kerning, a baseline, a leading, a counter, and a Bezier curve.

At block 514 "randomize the exchange glyph with the randomized set of vector attribute values to produce a randomized glyph" the exchange glyph may be randomized with the randomized vector attribute values to produce the randomized glyph. For example, typeface manipulator 312 may randomize the exchange glyph 326 with the randomized vector attribute values 328 to produce randomized glyph 330. Proceeding to block 516 "generate simulated handwriting comprising the randomized glyph" simulated handwriting comprising the randomized glyph may be generated. For instance, typeface manipulator 312 may generate simulated handwriting 332 comprising the randomized glyph 330. Continuing to block 518 "utilize the simulated handwriting to train or evaluate a computer vision process" the simulated handwriting may be utilized to train or evaluate a computer vision process. For example, simulated handwriting 332 may be utilized to train or evaluate computer vision process 108.

Figure 5B:
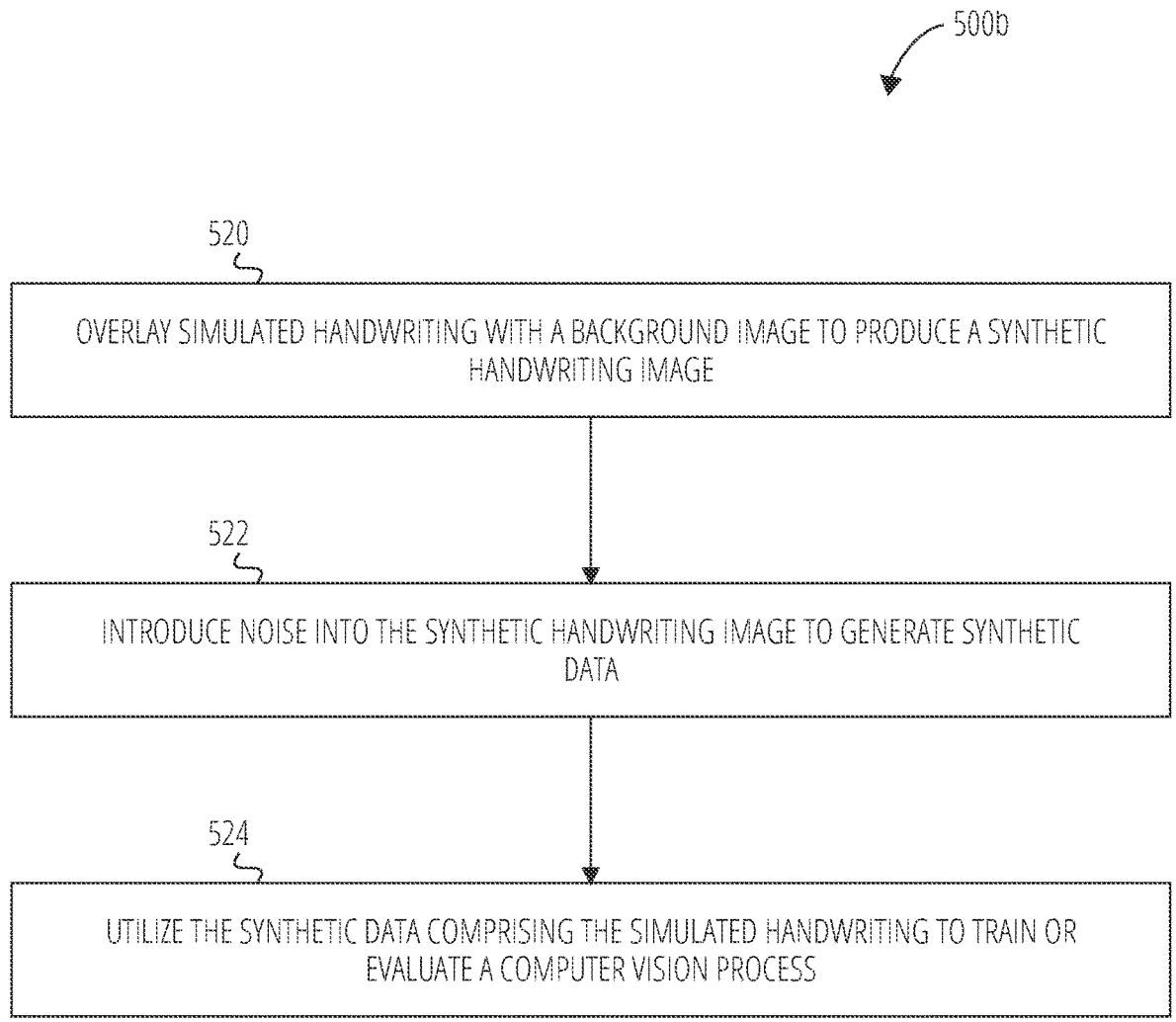
FIG. 5B illustrates an exemplary logic flow according to one or more embodiments described hereby.

FIG. 5B illustrates one embodiment of a logic flow 500b, which may be representative of operations that may be executed in various embodiments in conjunction with techniques disclosed hereby. The logic flow 520 (deleted) may be representative of some or all of the operations that may be executed by one or more components/devices/environments described hereby, such as synthetic data generator 102, computer vision process 108, output controller 212, incorporator 404, and/or manipulator 408. The embodiments are not limited in this context.

In the illustrated embodiment, logic flow 500b may begin at block 520. At block 520 "overlay simulated handwriting with a background image to produce a synthetic handwriting image" simulated handwriting may be overlaid with a background image to produce a synthetic handwriting image. For example, incorporator 404 may overlay simulated handwriting 402 with an image from image library 410 to produce synthetic handwriting image 418. In some embodiments, one or more of the randomization parameters 412 (e.g., randomization factor 414) may be utilized to select the image from image library 410.

Continuing to block 522 "introduce noise into the synthetic handwriting image to generate synthetic data" noise may be introduced into the synthetic handwriting image to generate synthetic data. For example, manipulator 408 may introduce noise into the synthetic handwriting image 418 to generate synthetic data 406. In some embodiments, manipulator 408 may introduce noise into the synthetic handwriting image 418 based on one or more of randomization parameters 412 (e.g., randomization factor 416). In various embodiments, manipulator 408 may add one or more of image blur, errata, wrinkles, misalignment, and rotation to the synthetic handwriting image 418 to introduce noise into the synthetic handwriting image 418 to generate the synthetic data 406. Continuing to block 524 "utilize the synthetic data comprising the simulated handwriting to train or evaluate a computer vision process" the synthetic data comprising the simulated handwriting may be utilized to train or evaluate a computer vision process. For example, synthetic data 406 comprising simulated handwriting 402 may be utilized to train or evaluate computer vision process 108.

Figure 6:
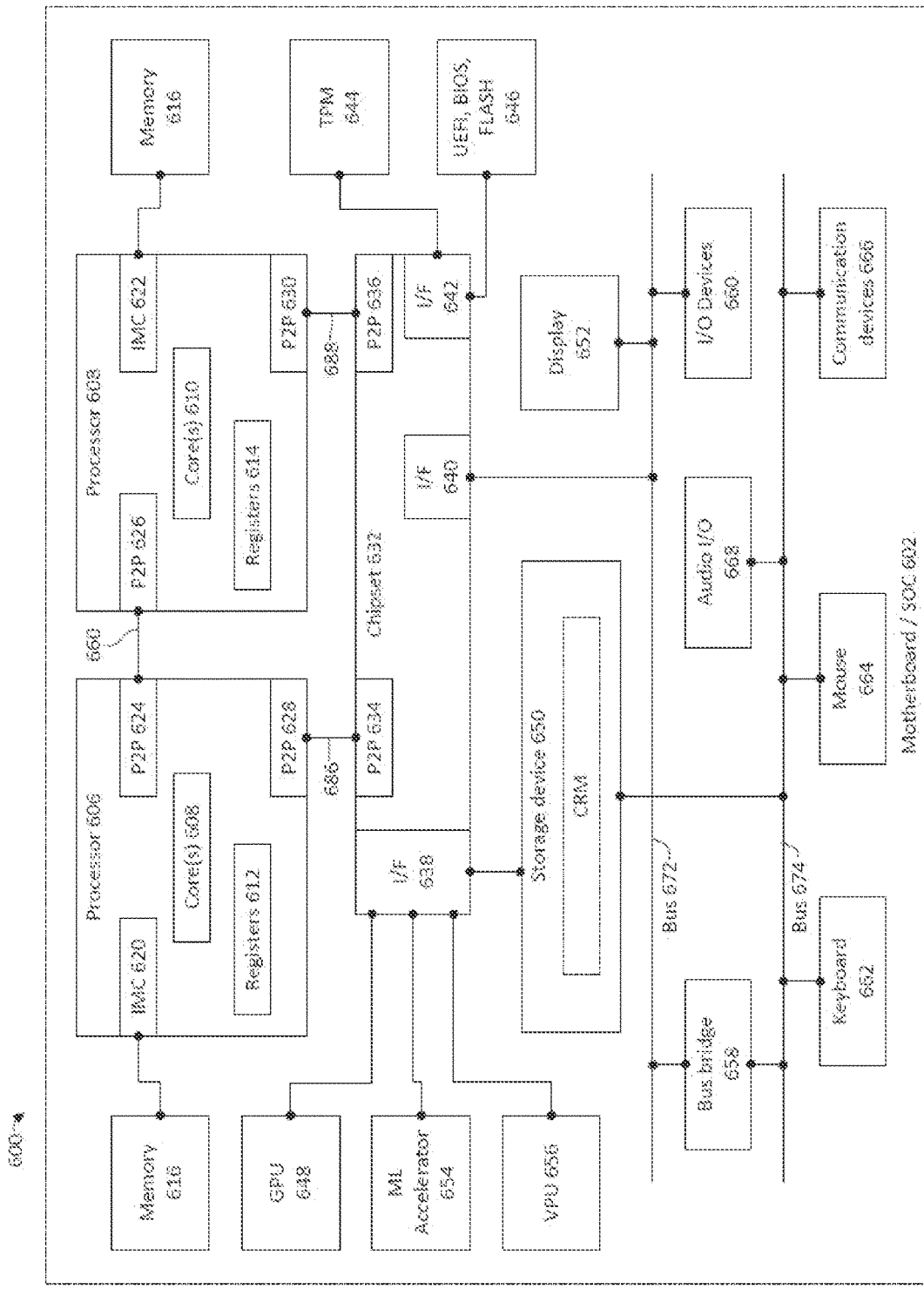
FIG. 6 illustrates exemplary aspects of a computing system according to one or more embodiments described hereby.

FIG. 6 illustrates an embodiment of a system 600 that may be suitable for implementing various embodiments described hereby. System 600 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as a user interface for interacting with, configuring, or implementing synthetic data generator 102, such as by providing one or more randomization parameters or input text. More generally, the computing system 600 is configured to implement all logic, systems, logic flows, methods, apparatuses, and functionality described hereby with reference to FIGS. 1-7. The embodiments are not limited in this context.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 670 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g. SoC, or the like).

The processor 604 and processor 606 can be any of various commercially available processors, including without limitation an Intel® processors; AMD® processors; ARM® processors; IBM® processors; and similar processors. Dual microprocessors, multi-core processors, and other multi-processor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In other embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e). Storage device 650 can store instructions executable by circuitry of system 600 (e.g., processor 604, processor 606, GPU 648, ML accelerator 654, vision processing unit 656, or the like). For example, storage device 650 can store instructions for handwriting simulator 104 and/or output controller 106.

Processor 604 couples to a chipset 632 via P2P interface 628 and P2P 634 while processor 606 couples to a chipset 632 via P2P interface 630 and P2P 636. Direct media interface (DMI) 676 and DMI 678 may couple the P2P interface 628 and the P2P 634 and the P2P interface 630 and P2P 636, respectively. DMI 676 and DMI 678 may be a high-speed interconnect that facilitates, e.g., eight Giga Transfers per second (GT/s) such as DMI 3.0. In other embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632.

Additionally, ML accelerator 654 and/or vision processing unit 656 can be coupled to chipset 632 via I/F 638. ML accelerator 654 can be circuitry arranged to execute ML related operations (e.g., training, inference, etc.) for ML models. Likewise, vision processing unit 656 can be circuitry arranged to execute vision processing specific or related operations. In particular, ML accelerator 654 and/or vision processing unit 656 can be arranged to execute mathematical operations and/or operands useful for machine learning, neural network processing, artificial intelligence, vision processing, etc.

Various I/O devices 660 and display 652 couple to the bus 672, along with a bus bridge 658 which couples the bus 672 to a second bus 674 and an I/F 640 that connects the bus 672 with the chipset 632. In one embodiment, the second bus 674 may be a low pin count (LPC) bus. Various devices may couple to the second bus 674 including, for example, a keyboard 662, a mouse 664 and communication devices 666.

Furthermore, an audio I/O 668 may couple to second bus 674. Many of the I/O devices 660 and communication devices 666 may reside on the motherboard or system-on-chip (SoC) 602 while the keyboard 662 and the mouse 664 may be add-on peripherals. In other embodiments, some or all the I/O devices 660 and communication devices 666 are add-on peripherals and do not reside on the motherboard or system-on-chip (SoC) 602.

Figure 7:
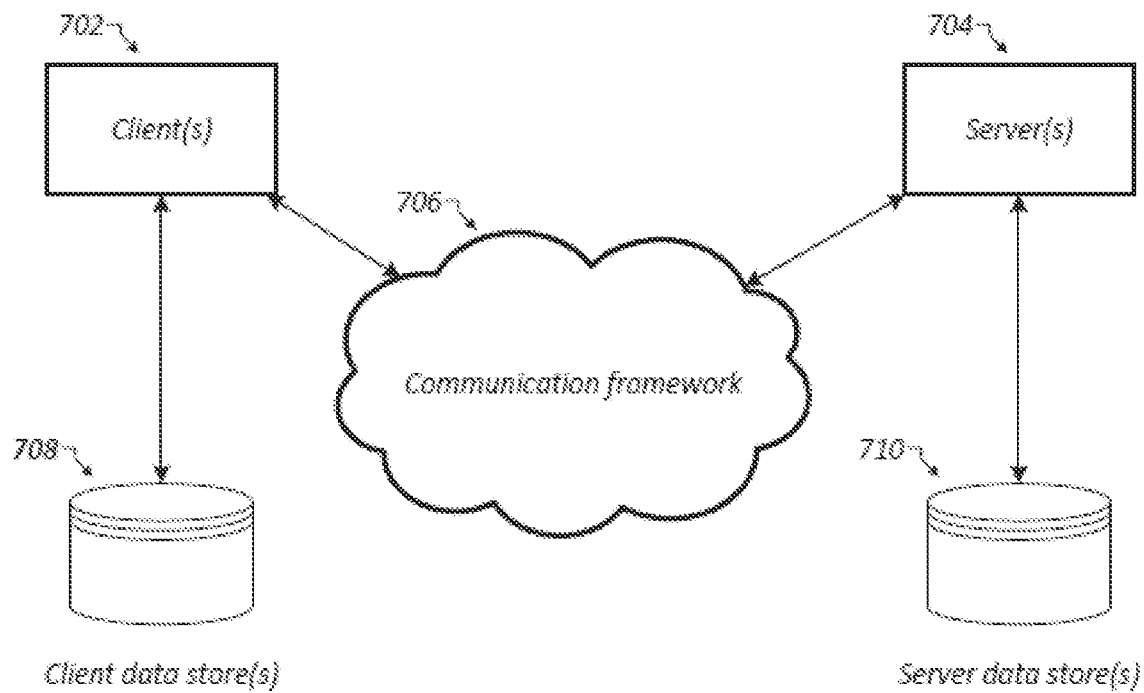
FIG. 7 illustrates exemplary aspects of a communications architecture according to one or more embodiments described hereby.

FIG. 7 illustrates a block diagram of an exemplary communications architecture 700 suitable for implementing various embodiments as previously described, such as communications between secondary synthetic data generator 102 and computer vision process 108 or handwriting simulator 104 and output controller 106. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described hereby. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described hereby, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described hereby.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/300 (deleted)/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus, the apparatus comprising:
   a processor; and
   memory comprising instructions that when executed by the processor cause the processor to:
   access input text comprising a plurality of characters,
   access a typeface comprising a plurality of glyphs and vector attributes, and
   generate simulated handwriting for the input text, wherein generating the simulated handwriting includes the processor being configured to, for each of the plurality of characters:
     determine an exchange glyph of the plurality of glyphs that corresponds with a character of the plurality of characters,
     generate randomized vector attributes for the exchange glyph based on at least one randomization parameter determined or generated based on input via a user interface,
     apply the randomized vector attributes to the exchange glyph to generate a randomized glyph, and
     replace the character with the randomized glyph;
   wherein the processor is further caused to access the typeface from a set of typefaces, wherein the set of typefaces includes at first subset of typefaces having discrete changes and a second subset of typefaces having continuous changes; and
   wherein accessing the typeface from the set of typefaces includes the processor being configured to select the typeface from among the second subset of typefaces.

2. The apparatus of claim 1, wherein the plurality of characters includes depicting one or more of a name, address, account number, routing number, signature, or endorsement associated with an entity.

3. The apparatus of claim 1, wherein the processor is further caused to use the simulated handwriting to train or evaluate a computer vision process.

4. The apparatus of claim 3, wherein the processor is further caused to alter the input text from a first typeface to a second typeface and use the input text as labels for the simulated handwriting that is generated, wherein the labels are used to evaluate the accuracy of the computer vision process.

5. The apparatus of claim 1, wherein the processor is further caused to:
   utilize the simulated handwriting, the at least one randomization parameter, and an image library to produce a synthetic handwriting image; and
   introduce noise to the synthetic handwriting image to generate synthetic data to train or evaluate a computer vision process.

6. The apparatus of claim 1, wherein the randomized vector attributes include one or more of a coordinate, a path, a curve, a font size, a weight, an alignment, a color, a consistency, a kerning, a baseline, a leading, a counter, or a Bezier curve.

7. The apparatus of claim 1, wherein the randomized vector attributes for the exchange glyph include a default value; and
   wherein the processor is further caused to vary the default value for at least one randomized vector attribute of the exchange glyph based on the at least one randomization parameter as part of generating the randomized vector attributes.

8. A method comprising:
accessing, by a computing device, input text comprising a plurality of characters;
accessing, by the computing device, a typeface comprising a plurality of glyphs and vector attributes; and
generating, by the computing device, simulated handwriting for the input text, wherein generating the simulated handwriting includes, for each of the plurality of characters:
determining an exchange glyph of the plurality of glyphs that corresponds with a character of the plurality of characters;
generating randomized vector attributes for the exchange glyph based on at least one randomization parameter determined or generated based on input via a user interface;
applying the randomized vector attributes to the exchange glyph to generate a randomized glyph; and
replacing the character with the randomized glyph;
wherein the method further includes accessing the typeface from a set of typefaces, wherein the set of typefaces includes at first subset of typefaces having discrete changes and a second subset of typefaces having continuous changes; and
wherein accessing the typeface from the set of typefaces includes selecting the typeface from among the second subset of typefaces.

9. The method of claim 8, wherein the plurality of characters includes depicting one or more of a name, address, account number, routing number, signature, or endorsement associated with an entity.

10. The method of claim 8, wherein the method further includes using the simulated handwriting to train or evaluate a computer vision process.

11. The method of claim 10, wherein the method further includes altering the input text from a first typeface to a second typeface and use the input text as labels for the simulated handwriting that is generated, wherein the labels are used to evaluate the accuracy of the computer vision process.

12. The method of claim 8, wherein the method further includes:
utilizing the simulated handwriting, the at least one randomization parameter, and an image library to produce a synthetic handwriting image; and
introducing noise to the synthetic handwriting image to generate synthetic data to train or evaluate a computer vision process.

13. The method of claim 8, wherein the randomized vector attributes include one or more of a coordinate, a path, a curve, a font size, a weight, an alignment, a color, a consistency, a kerning, a baseline, a leading, a counter, or a Bezier curve.

14. The method of claim 8, wherein the randomized vector attributes for the exchange glyph include a default value; and
wherein the method further includes varying the default value for at least one randomized vector attribute of the exchange glyph based on the at least one randomization parameter as part of generating the randomized vector attributes.

15. A non-transitory computer-readable storage medium having executable instructions stored thereon, which when executed by a processing circuit of a computing device, configures the processing circuit to:
access input text comprising a plurality of characters;
access a typeface comprising a plurality of glyphs and vector attributes; and
generate simulated handwriting for the input text via, wherein generating the simulated handwriting includes the processing circuit being configured to, for each of the plurality of characters:
determine an exchange glyph of the plurality of glyphs that corresponds with a character of the plurality of characters;
generate randomized vector attributes for the exchange glyph based on at least one randomization parameter determined or generated based on input via a user interface;
apply the randomized vector attributes to the exchange glyph to generate a randomized glyph; and
replace the character with the randomized glyph;
wherein the processing circuit is further configured to access the typeface from a set of typefaces, wherein the set of typefaces includes at first subset of typefaces having discrete changes and a second subset of typefaces having continuous changes; and
wherein accessing the typeface from the set of typefaces includes the processing circuit being configured to select the typeface from among the second subset of typefaces.

16. The non-transitory computer-readable storage medium of claim 15, wherein the plurality of characters includes depicting one or more of a name, address, account number, routing number, signature, or endorsement associated with an entity.

17. The non-transitory computer-readable storage medium of claim 15, wherein the processing circuit is further configured to use the simulated handwriting to train or evaluate a computer vision process.

18. The non-transitory computer-readable storage medium of claim 17, wherein the processing circuit is further configured to alter the input text from a first typeface to a second typeface and use the input text as labels for the simulated handwriting that is generated, wherein the labels are used to evaluate the accuracy of the computer vision process.

19. The non-transitory computer-readable storage medium of claim 15, wherein the processing circuit is further caused to:
utilize the simulated handwriting, the at least one randomization parameter, and an image library to produce a synthetic handwriting image; and
introduce noise to the synthetic handwriting image to generate synthetic data to train or evaluate a computer vision process.

20. The non-transitory computer-readable storage medium of claim 15, wherein the randomized vector attributes include one or more of a coordinate, a path, a curve, a font size, a weight, an alignment, a color, a consistency, a kerning, a baseline, a leading, a counter, or a Bezier curve;
wherein the randomized vector attributes for the exchange glyph include a default value; and
wherein the processing circuit is further configured to vary the default value for at least one randomized vector attribute of the exchange glyph based on the at least one randomization parameter as part of generating the randomized vector attributes.

* * * * *